(12) United States Patent
Acharya et al.

(10) Patent No.: US 7,546,370 B1
(45) Date of Patent: Jun. 9, 2009

(54) SEARCH ENGINE WITH MULTIPLE CRAWLERS SHARING COOKIES

(75) Inventors: Anurag Acharya, Campbell, CA (US); Michal Louz-On, Philadephia, PA (US); Alexander C. Roetter, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 867 days.

(21) Appl. No.: 10/921,378

(22) Filed: Aug. 18, 2004

(51) Int. Cl.
G06F 15/173 (2006.01)

(52) U.S. Cl. .................. 709/227; 709/223; 715/745

(58) Field of Classification Search .............. 707/3, 707/E17; 709/200, 203, 223, 227; 715/745
See application file for complete search history.

(56) References Cited

U.S. PATENT DOCUMENTS

| | | | |
|---|---|---|---|
| 6,195,622 B1 | 2/2001 | Altschuler et al. | 703/2 |
| 6,263,364 B1 * | 7/2001 | Najork et al. | 709/217 |
| 6,366,947 B1 | 4/2002 | Kavner | 709/203 |
| 6,418,452 B1 * | 7/2002 | Kraft et al. | 707/200 |
| 6,499,052 B1 * | 12/2002 | Hoang et al. | 709/203 |
| 6,665,658 B1 * | 12/2003 | DaCosta et al. | 707/3 |
| 6,725,269 B1 | 4/2004 | Megiddo | 709/228 |
| 2002/0023158 A1 * | 2/2002 | Polizzi et al. | 709/227 |
| 2002/0057678 A1 | 5/2002 | Jiang et al. | 370/353 |
| 2002/0120685 A1 | 8/2002 | Srivastava et al. | 709/203 |
| 2002/0169818 A1 * | 11/2002 | Stewart et al. | 709/202 |
| 2003/0037131 A1 * | 2/2003 | Verma | 709/223 |
| 2004/0049673 A1 | 3/2004 | Song et al. | 713/150 |
| 2004/0128383 A1 * | 7/2004 | Hinton | 709/225 |
| 2004/0205149 A1 | 10/2004 | Dillon et al. | 709/217 |
| 2005/0154887 A1 * | 7/2005 | Birk et al. | 713/168 |
| 2005/0216845 A1 * | 9/2005 | Wiener | 715/745 |

OTHER PUBLICATIONS

Raghavan et al. Crawling the Hidden Web. 2001. pp. 1-25.*
Miller, Rob. WebSPHINX. 2002. pp. 1-8.*
Alvarez et al. Client-Side Deep Web Data Extraction. 2004. pp. 1-4.*
Kristol, D., et al., "HTTP State Management Mechanism, RCF 2109" Feb. 1997.
Kristol, D., et al., "HTTP State Management Mechanism RCF 2965," Oct. 2000.

* cited by examiner

Primary Examiner—Salad Abdullahi
Assistant Examiner—Imad Hussain
(74) Attorney, Agent, or Firm—Morgan, Lewis & Bockius LLP

(57) ABSTRACT

A web-crawler system includes a plurality of network crawlers configured to fetch documents from hosts on a network and a cookie database shared by the plurality of network crawlers. The cookie database stores cookies and associated information for use by the plurality of network crawlers. Each network crawler is configured to retrieve one or more cookies from the cookie database so as to enable access to documents on at least one of the hosts on the network. In some embodiments, each of the network crawlers may be configured to detect any of a plurality of predefined cookie errors associated with fetching a document. In some embodiments, each of the network crawlers may also be configured to detect when a cookie in the cookie database has expired and to obtain a replacement cookie.

11 Claims, 4 Drawing Sheets

SEARCH ENGINE WITH MULTIPLE CRAWLERS SHARING COOKIES

BRIEF DESCRIPTION OF THE INVENTION

The present invention relates generally to a search engine, and more specifically to a system and method of downloading documents from a network using multiple network crawlers.

BACKGROUND OF THE INVENTION

Search engines provide a powerful source of indexed documents from a network, such as the Internet, that can be rapidly scanned. To maintain freshness of the documents in the search engine's index, at least some of the indexed documents need to be rescanned frequently, and all or many of the remaining indexed documents need to be rescanned periodically, but somewhat less frequently. Scanning also results in the discovery of new documents, because revised documents will contain links to such new documents, and therefore frequent rescanning is required in order to bring new documents into a search engine index on a timely basis. If the number of indexed documents is large (e.g., billions of documents), accomplishing such scanning in a timely manner requires the use of multiple network crawlers (or web crawlers) operating in parallel.

The host servers of many web sites require a requester to have possession of one or more cookies in order to gain access to some or all of the documents on those web sites. Cookies are typically implemented as files stored on the requester's computer that indicate the requester's identity or other information required by many web sites. The terms "cookie" and "cookie file" may be used interchangeably. Cookies may include information such as login or registration identification, user preferences, or any other information that a web host sends to a user's web browser for the web browser to return to the web host at a later time. The many uses of cookies, and the mechanisms for creating, using, invalidating and replacing cookies are well known to those skilled in the art, and are beyond the scope of this document.

Conventional network crawlers have no facility for obtaining such cookies, nor for handling various cookie error conditions. As a result, conventional web crawlers are unable to crawl a full set of pages or documents in web sites that require cookies, thereby reducing the amount of information available through use of such search engines. In addition, conventional network crawlers have no facilities for coordinating the efforts of a parallel set of network crawlers with respect to crawling a full set of pages or documents in web sites that require cookies. There is a need, therefore, for an improved search engine that uses multiple crawlers to access web sites that require cookies.

SUMMARY OF THE INVENTION

A web-crawler system includes a plurality of network crawlers configured to fetch documents from hosts on a network and a cookie database shared by the plurality of network crawlers. The cookie database stores cookies and associated information for use by the plurality of network crawlers. Each of the network crawlers is configured to retrieve one or more cookies from the cookie database so as to enable access to documents on at least one of the hosts on the network.

In some embodiments, each of the network crawlers is configured to determine if a cookie is in the cookie database prior to retrieving the cookie.

The cookie database may include URL pattern information for each cookie. The cookie database may include cookie acquisition information for each cookie in the cookie database. Alternatively, the cookie database may include cookie acquisition information for a subset of the cookies in the cookie database.

In some embodiments each of the network crawlers is configured to detect any of a plurality of predefined cookie errors associated with fetching a document. Cookie errors may be detected by each of the network crawlers by comparing a fetched document with a plurality of predefined cookie error patterns. Information identifying a cookie error associated with a respective document may be stored in a history log.

In some embodiments the cookie database includes timeout information for one or more of the cookies. Each of the network crawlers may be configured to detect when a cookie in the cookie database has expired and to obtain a replacement cookie.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE EMBODIMENTS

Reference will now be made in detail to embodiments of the invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

Figure 1:
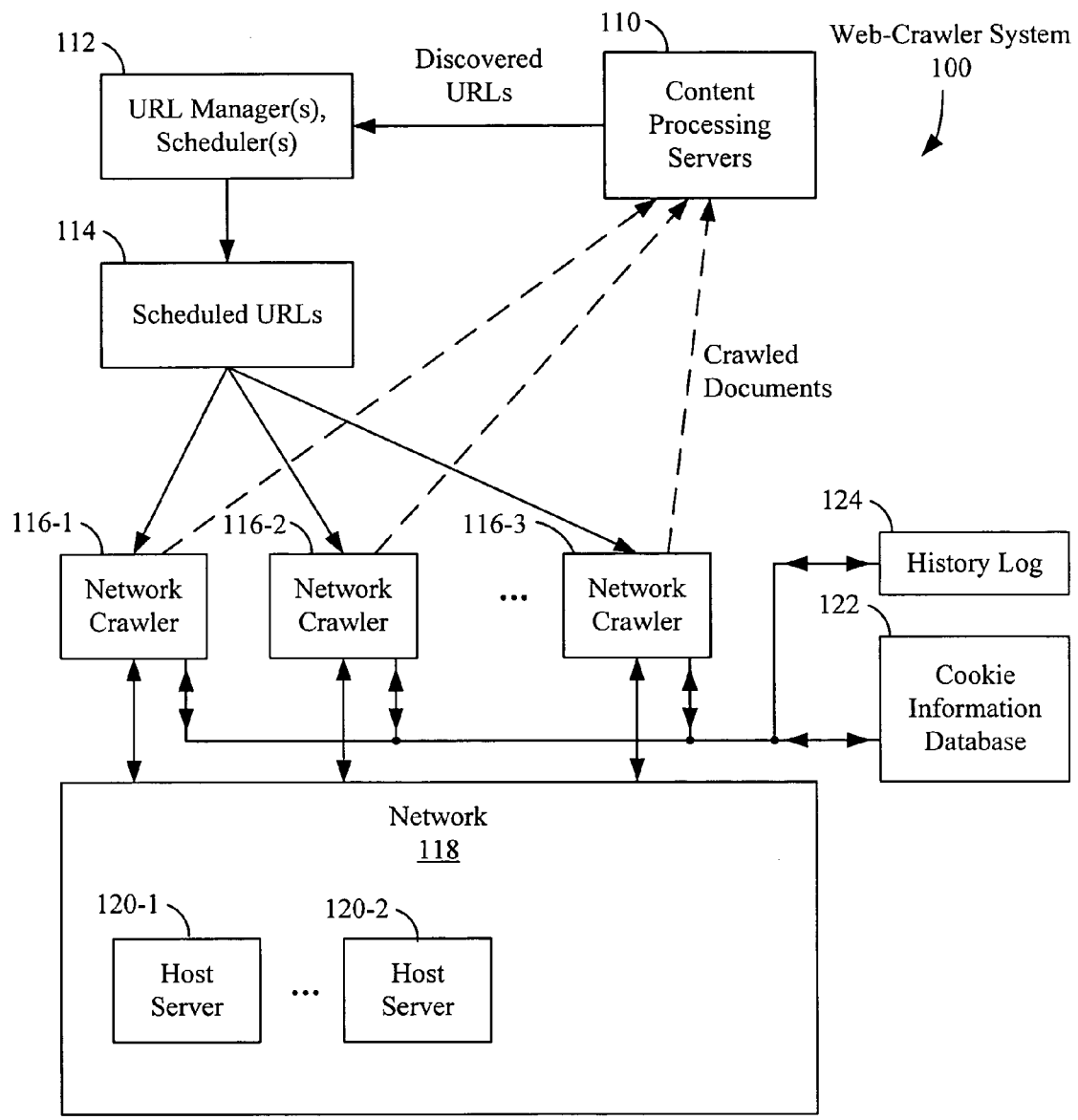
FIG. 1 is a block diagram illustrating a system for crawling web pages.

FIG. 1 illustrates a web-crawler system 100. Content processing servers 110 inspect web pages and other documents downloaded by a plurality of network crawlers to identify new or previously known universal resource locators (URLs), or other addresses, of documents to be crawled by a set of network crawlers 116. Network crawlers 116 are also sometimes called web crawlers. The URLs may correspond to locations within host servers 120 containing, for example, web sites, on a network 118. Alternatively, the URLs may correspond to locations within host servers 120 containing documents on the network 118, such as a document database. URL Managers and Schedulers 112 determine which URLs (herein called the scheduled URLs 114) to schedule for crawling by the plurality of network crawlers 116. The network crawlers 116 access and download documents, such as web pages and other types of documents, from the host servers 120 on the network 118.

The network 118 may be the Internet, a portion of the Internet, an Intranet or portion there of, or a specified combination of Intranet(s) and/or host servers on the Internet. The documents and web pages stored by the host servers 120 contain links to other documents or web pages. Conceptually, the network crawlers 116 are programs that automatically traverse the network's hypertext structure. In practice, the network crawlers 116 may run on separate computers or servers. For convenience, the network crawlers 116 may be thought of as a set of computers, each of which is configured to execute one or more processes or threads that download documents from the scheduled URLs 114.

The network crawlers 116 receive the assigned URLs and download (or at least attempt to download) the documents at those URLs. The network crawlers 116 may also retrieve documents that are referenced by the retrieved documents. The network crawlers 116 pass the retrieved documents to the content processing servers 110, which process the links in the downloaded pages, from which the URL Managers and Schedulers 112 determine which pages are to be crawled.

Network crawlers 116 use various protocols to download pages associated with URLs, such as HTTP, HTTPS, gopher and File Transfer Protocol. In addition, network crawlers 116 are capable of communicating with web sites that use cookies.

Cookies are computer-generated files that are issued to a client computer by a "cookie server" associated with a URL either before or while the URL is electronically contacted by the client computer. In this context, the network crawlers 116 are considered to be client computers. "Cookies" are typically small files whose transmission time between client and server is very short, although this is not necessarily always the case. Cookies may be stored in memory or in data structures other than traditional files, such as records in a database. The term "cookie server" is used herein to mean a host server that issues cookies to client computers and requires client computers to have particular cookies in order access particular information or particular documents on the host server. The cookie server may use cookies for any of a variety purposes, including the secure storage of personal information, status information specific to a particular user, and so on. For example, the cookie server can store a cookie on a client computer and update the cookie with each time the URL associated with the cookie server is visited by that client computer. As noted earlier, the many uses of cookies, and the mechanisms for creating, using, invalidating and replacing cookies are well known to those skilled in the art, and are beyond the scope of this document.

Traditionally, interaction between one of the network crawlers 116, for example, network crawler 116-1, and a host server that uses cookies has been problematic because network crawler 116-1 does not have the requisite cookies to present to the host server to enable access to a crawler-specified URL. Therefore, network crawler 116-1 is either not granted permission to access the URL or is routed to a first time visitor web page rather than the desired destination. The problem of addressing the use of cookies is made more difficult in the web-crawling system 100 which has multiple network crawlers 116 to perform web crawling. In the web-crawling system 100, each of the network crawlers 116 is assigned URLs on a substantially random or pseudo-random basis. Therefore, in all likelihood, when one of the network crawlers 116, for example, network crawler 116-1, crawls any given URL, it was not the network crawler 116 to have last downloaded a page from the same host server. Thus, even if network crawler 116-1 were to have crawled a given URL and received cookies from the URL's host server, there is a very low chance that network crawler 116-1, in this example, will be used to crawl a next URL on the same web server. Furthermore, if all the scheduled URLs for a particular web site were assigned to a particular network crawler 116, this would potentially slow down the network crawl for large web sites, and would complicate the design of the web crawler system.

To address the problem of crawling URLs whose use is regulated by cookies, a cookie information database 122 is provided. The cookie information database 122 provides stable storage for cookies sent to the network crawlers 116 by cookie servers on the Internet. The cookie database 122 is structured so that cookie servers can request and update the cookies in the cookie database 122, using exactly the same protocols as when the cookie servers are interacting with ordinary client computers.

The ability of a network crawler 116 to access cookies acquired by other ones of the network crawlers 116 when accessing documents from various host servers provides a number of advantages, including enabling access to the content stored on those host servers and/or speeding up access to that content. In some cases, the shared use of cookies facilitates regulating which content is accessed from a host server, for example, by "user preferences" specified in the shared cookie. Most importantly, though, the use of the cookie database 122 enables network crawlers 116 to crawl content that is regulated by cookie servers. By maintaining a shared cookie database 122, each of the network crawlers 116 gets the full benefit of any prior interaction with cookie servers by any of the network crawlers 116 within the web-crawling system 100.

Figure 2:
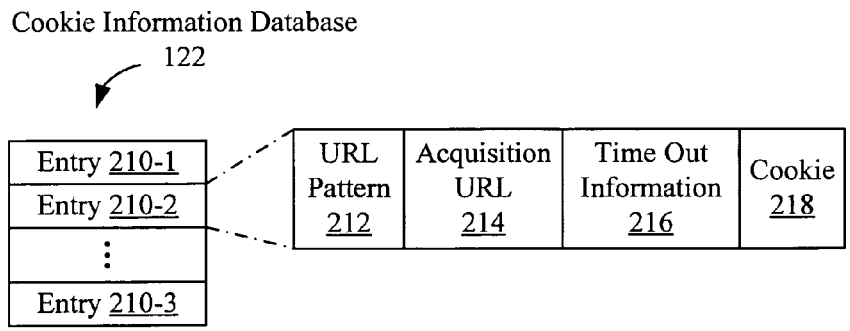
FIG. 2 illustrates a cookie database.

Referring to FIG. 2, the cookie database 122 contains entries 210, with each entry corresponding to a set of URLs that make use of cookies in some way. In one embodiment, each entry 210-i includes a URL pattern 212, an acquisition URL 214, time out information 216, and a cookie 218. The URL pattern 212 identifies a set or range of URLs that use the cookie 218. For instance, the URL pattern may be www.websitename.com\name1\.* which indicates that any or all URL's having a particular prefix may request the cookie specified by this cookie database entry 210. Note that some URLs may use more than one cookie. As a consequence, a particular URL may fall within the set of URLs corresponding to the URL patterns 214 in more than one cookie database entry 210.

The acquisition URL 214 in a cookie database entry 210 is the URL to be used by any of the network crawlers 116 for obtaining a new version of the cookie 218. The acquisition URL 214 may include a CGI script or other embedded information that enables a network crawler 116 to obtain a valid cookie. In some cookie database entries 210, the acquisition URL 214 may be omitted. For instance, this may be the case for cookies that cannot be acquired using a single URL. However, in one embodiment, a majority of the cookie database entries 210 contain valid acquisition URLs 214.

Timeout information 216 indicates when the corresponding cookie 218 expires. When a cookie is issued by a host server, an expiration time is typically issued with the cookie. That expiration time is stored in the cookie database record 210. The network crawlers 116 may be configured to obtain replacement cookies for cookies that have expired and to update the cookie database 122 with the replacement cookies and their corresponding timeout information.

In some embodiments, one or more of the cookie database entries 210 includes one or more conditions. For instance, a value in the conditions may indicate that the cookie 218 should not be updated, even when the host server sends an updated cookie to one of the network crawlers 116 that is accessing a URL that satisfies the URL pattern 212 of the cookie database entry 210, unless the cookie 218 has expired. In another example, one or more values within the conditions may be used to define the conditions under which the cookie 218 is replaced with an updated cookie. In yet another example, one or more values within the conditions may be used to define the conditions under which the cookie 218 is presented to a host server. However, URLs for which cookies are not to be presented to the host server can be specified through the URL patterns 212 of the cookie database entries 210.

In some embodiments, the network crawlers 116 are configured to detect any of a plurality of predefined cookie errors associated with fetching a document. Cookie errors may be detected by each of the network crawlers 116 by comparing a fetched document with a plurality of predefined cookie error patterns. Cookie error patterns include error messages, login request messages and the like, which result when a network crawler attempts to access an URL without a requisite cookie, or when a network crawler attempts to access an URL using an expired or otherwise incorrect cookie. In some embodiments, a cookie error associated with a respective document on at least one of the hosts may be stored in a history log 124 (shown in FIGS. 1 and 4). In other embodiments, cookie errors are not recorded in a history log.

Figure 4:
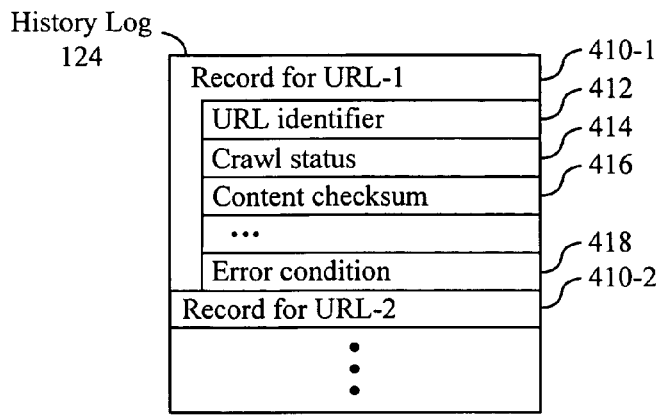
FIG. 4 illustrates a history log data structure.

An illustration of a data structure for storing the history log 124 is shown in FIG. 4. In some embodiments, the history log 124 may be stored in one server, while in other embodiments the history log 124 may be distributed over multiple servers. The records 410 in the history log may be stored in one or more files. History log records 410 are generated and stored for a plurality of URL download events. Each of the history log records 410 indicates the outcome of a URL download attempt. In some embodiments, the record 410-1 for a particular URL download attempt includes a URL identifier 412 for identifying the URL that a network crawler attempted to download, a crawl status 414 (e.g., an indication of whether the download was successful), a content checksum 416, and an error condition 418.

In one embodiment the URL identifier 412 is a URL fingerprint, which is produced by applying a hash function to a URL after the URL has been converted to normalized or canonical form in accordance with a set of normalization rules. The content checksum may be the product of applying a hash function to the content of the document downloaded from the URL. The error condition 418 may indicate the type of error, if any, encountered while trying to download a document from the URL. Examples of errors that may be indicated by the error condition 418 include: that the URL is invalid (i.e., there is no document at that address), that the download time exceeded a timeout limit, and that the host server returned a page indicating a cookie error. When a cookie error occurs, the error condition 418 may indicate a specific type of cookie error, such as a cookie timeout error, an invalid cookie, a cookie acquisition error, and so on. In one embodiment the network crawlers 116 are configured to identify fetched documents matching N different cookie error patterns, each having a distinct cookie error pattern identifier, where N is an integer greater than two. In this embodiment, the error condition 418 may include the cookie error pattern identifier of a cookie error pattern found in the document fetched from the identified URL.

Figure 5:
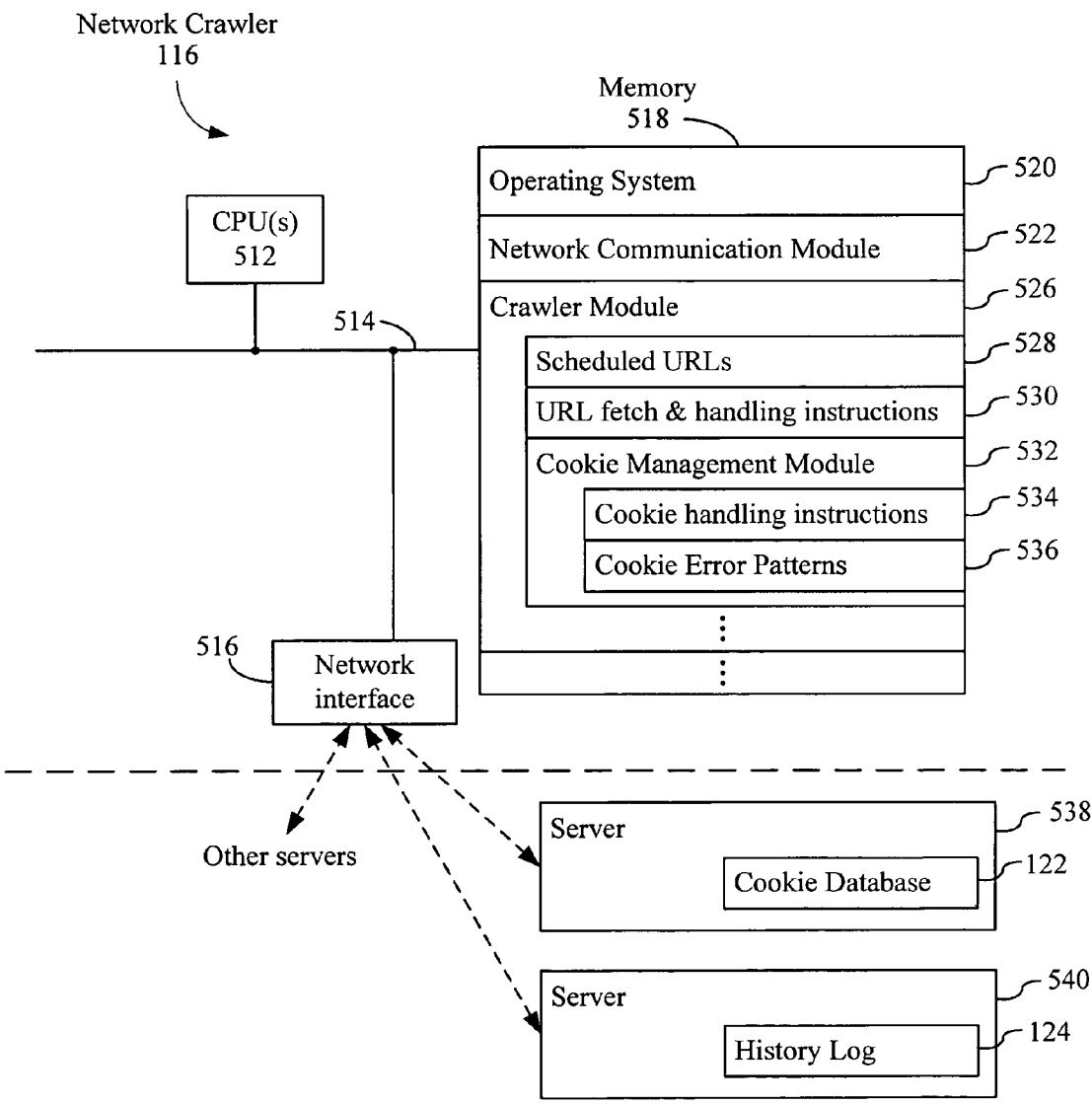
FIG. 5 is a block diagram illustrating a network crawler.

FIG. 5 is a block diagram illustrating one embodiment of a network crawler 116, such as one of the network crawlers shown in FIG. 1. The network crawler 116 includes one or more central processing units 512, one or more network interfaces, memory 518, all of which are interconnected by one or more communication buses 514. The one or more network interfaces 516 enable communications with a server 538 containing the cookie database 122, a server 540 containing the history log 124, host servers 120 (FIG. 1), one or more servers providing the scheduled URLs to fetch 114 (FIG. 1), and other servers, if needed. Note that the cookie database 122 can be resident on any computer that is accessible by the network crawlers 116 (as shown in FIG. 1).

Memory 518 may include high speed random access memory and may also include non-volatile memory, such as one or more magnetic disk storage devices. Memory 518 may include mass storage that is remotely located from the central processing unit(s) 512. In some embodiments, the memory 518 stores:

- an operating system 520 that includes procedures for handling various basic system services and for performing hardware dependent tasks;
- a network communications module 522 for controlling communications via the one or more network interfaces 516; and
- a crawler module 526.

The crawler module 526 includes a set of scheduled URLs 528 to be crawled, URL fetch and handling instructions 530, and a cookie management module (or set of instructions) 532. The cookie management module 532 includes cookie handling instructions 534 and cookie error patterns 536.

Figure 3:
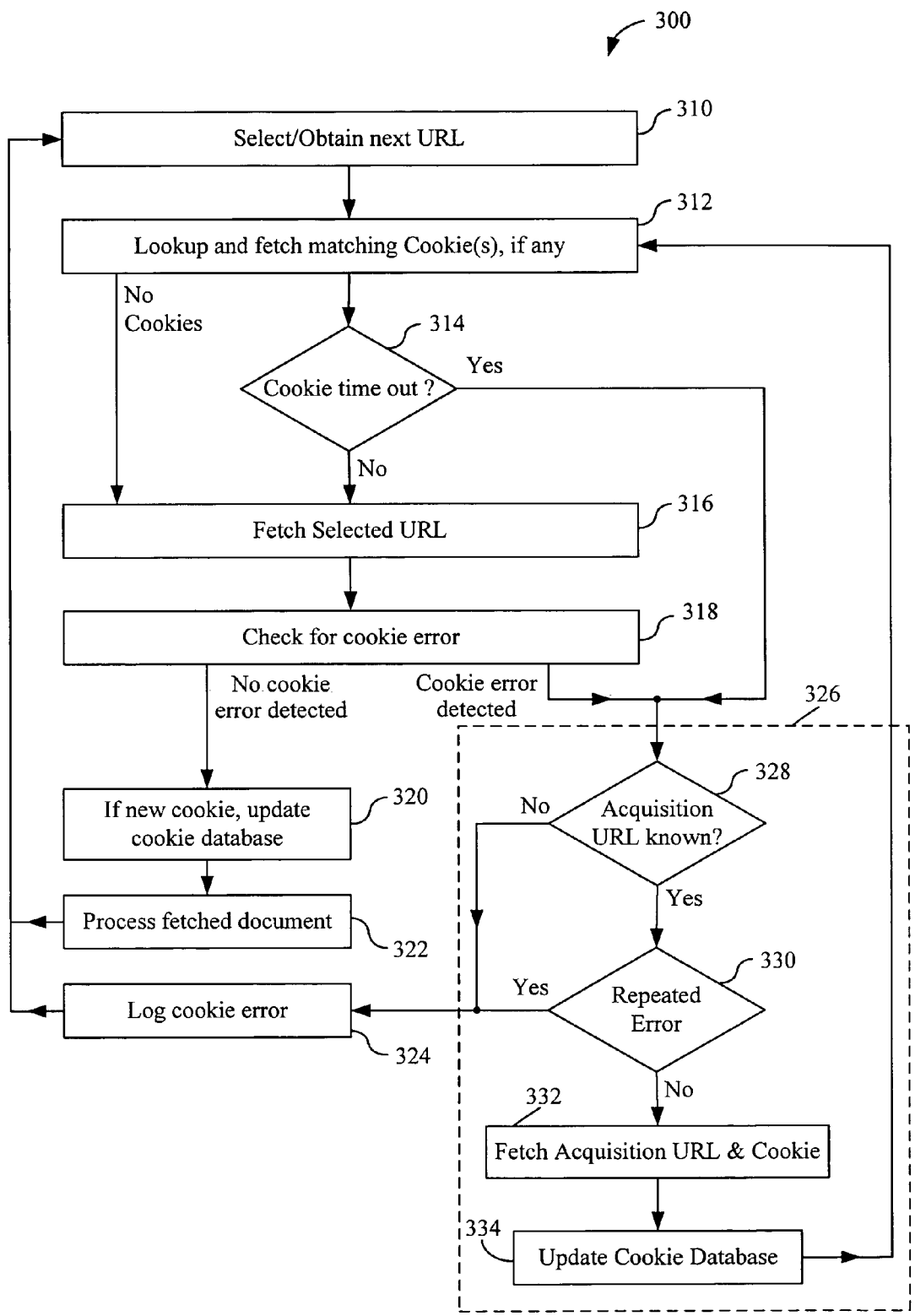
FIG. 3 is a flow diagram illustrating a method of web crawling.

FIG. 3 is a flow diagram illustrating an embodiment of a web crawling method 300 using shared cookies. The method 300 is performed by each of the network crawlers 116, which operate in parallel and substantially independently of each other. A first or next URL is selected or obtained 310. Cookies, if any, matching the next URL are looked up and fetched 312 from the cookie database (an example of which is shown in FIG. 2). If there is no cookie matching the URL in the cookie database, the URL is fetched 316. If a cookie is present in the cookie database, cookie lookup is accomplished by searching for cookie entries whose URL pattern encompasses a specified URL. Then, a determination is made if a cookie fetched from the cookie database has timed out 314. Cookie timeout may be determined by comparing timeout information 216 (see FIG. 2) in the cookie database entry 210 for a cookie 218 with the current time.

If the cookie 218 has timed out 314, a cookie error routine 326 is invoked. If an acquisition URL (for acquiring a replacement cookie) is unknown 328, a cookie error is logged 324 and the next URL is selected or obtained 310. If the cookie 218 has timed out 314 and the acquisition URL 214 is known 328, a determination is made if cookie errors have repeatedly occurred for a particular URL 330. For instance, the acquisition URL may be defective, or the host server may be issuing defective cookies, or some other error may be repeatedly occurring. If a repeated error condition is detected, a cookie error is logged 324 and the next URL is selected or obtained 310. In some embodiments, a repeated error condition may mean a predefined number (e.g., 2, 3 or 4) of consecutive errors.

If a repeated error condition is not detected (330—No), a document is fetched 332 using the acquisition URL 214, which results in the host server providing the network crawler with a new cookie 218 and a new cookie timeout. The cookie database 122 is updated 334 with the new cookie and new cookie timeout information, and the look-up and fetching of cookies, if any, matching the currently selected URL 312 is repeated.

If the cookie or cookies retrieved from the shared cookie database have not timed out (314—No), or if no cookies were retrieved from the shared cookie database, the selected URL is fetched 316 and a check is made for a cookie error 318. If a cookie error is detected, the cookie error routine 326 is invoked. If no cookie error is detected (318—No Error), the network crawler checks to see if fetching a document at the URL caused one or more new cookies to be returned by the host server for the URL. If one or more new cookies have been received, the cookie database 122 is updated 320 with the new cookie(s) and the timeout information for the new cookie(s). The fetched document is processed 322 and the procedure is repeated starting with selecting or obtaining the next URL 310.

In some embodiments, the web crawling method 300 is not iterative, i.e., the process is not repeated at operation 310. In yet other embodiments, the process is repeated only for content embedded in an initially identified URL, since the embedded content may require a cookie or a cookie stored in a cookie database.

Figure 6:
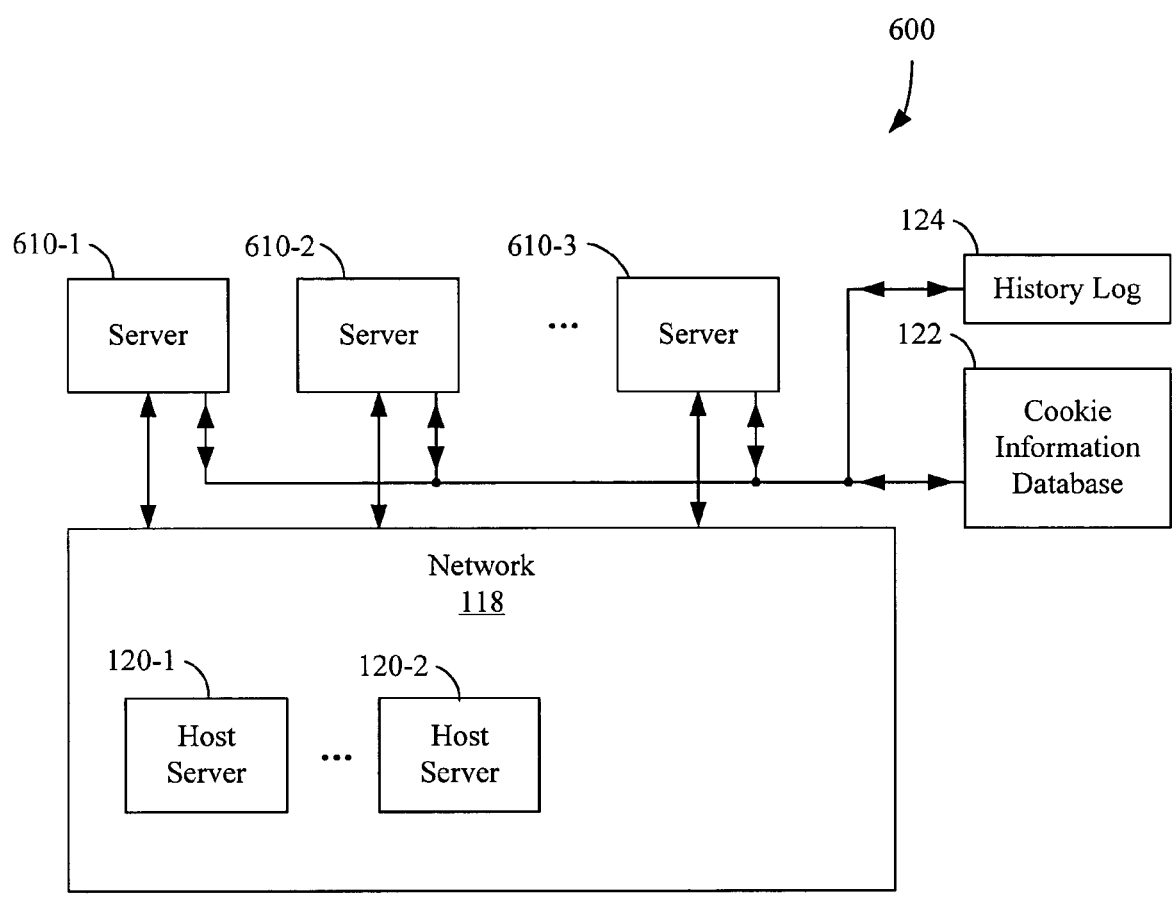
FIG. 6 is a block diagram illustrating an embodiment of the system.

FIG. 6 is a block diagram illustrating an embodiment 600 that is a variation on the system shown in FIG. 1. One or more server computers 610 are configured to fetch documents from hosts 120 on the network 118 and share the cookie information database 122.

The one or more server computers 610 may be similar to the network crawler 116 (FIG. 5), except that the crawler module 526 may be replaced by another application module that fetches URLs, some of which require cookies. The application module may be any application or service that downloads URLs on behalf of clients or other applications. The cookie database 122 stores cookies and associated information, including but not limited to URL pattern information for each cookie, for use by the one or more servers 610. The one or more servers 610, such as server 610_1, are configured to retrieve the one or more cookies from the cookie database 122 so as to enable access to documents on at least one of the hosts 120, such as host 120_1, on the network 618. In some embodiments, the one or more servers 610, such as server 610_1, are configured to determine if one or more cookies are in the cookie database 122.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A web crawler system, comprising:
a plurality of network crawlers each including, one or more processors and memory storing one or more modules to be executed by the one or more processors, the one or more modules having instructions for fetching documents from hosts on a network; and
a cookie database shared by the plurality of network crawlers, the cookie database storing cookies and associated information for use by the plurality of network crawlers;
wherein each network crawler of the plurality of network crawlers further includes instructions for retrieving one or more cookies from the cookie database so as to enable access to documents on at least one of the hosts on the network and each of the network crawlers includes instructions for detecting any of a plurality of predefined cookie errors associated with fetching a document by comparing a fetched document with a plurality of predefined cookie error patterns; and
wherein the cookie database includes cookie acquisition information corresponding to each of at least a plurality of the cookies in the cookie database; the cookie acquisition information for a respective cookie enabling a respective network crawler to acquire the cookie from an acquisition URL specified by the cookie acquisition information; wherein the acquisition URL is distinct from a target URL to be accessed using the respective cookie.

2. The web-crawler system of claim 1, wherein the cookie database includes cookie acquisition information corresponding to each cookie in the cookie database.

3. The web-crawler system of claim 1, wherein the web-crawler system includes a history log for storing at least a cookie error associated with a respective document on at least one of the hosts.

4. The web-crawler system of claim 1, wherein the cookie database includes timeout information for each cookie.

5. The web-crawler system of claim 1, wherein the cookie database includes timeout information for at least a plurality of the cookies in the cookie database.

6. The web-crawler system of claim 1, wherein each of the network crawlers includes instructions for:
detecting when a cookie in the cookie database has expired and;
obtaining a replacement cookie for the cookie that has expired, using the acquisition URL for the cookie that has expired.

7. A method of crawling documents on a network, comprising:
providing a plurality of network crawlers configured to fetch documents from hosts on the network; and
at each of the network crawlers, retrieving a respective cookie for a respective host from a shared cookie database that is shared by the plurality of network crawlers, so as to enable the plurality of network crawlers to have access to one or more documents on the respective host;
wherein the cookie database includes cookie acquisition information corresponding to each of at least a plurality of the cookies in the cookie database; the cookie acquisition information for a respective cookie including an acquisition URL;
the method including,
at a respective network crawler, acquiring a respective cookie from the acquisition URL specified for the cookie in the cookie database, and then accessing a respective target URL from a host on the network, the respective target URL corresponding to the acquired cookie; and
at each of the network crawlers, detecting any of a plurality of predefined cookie errors by comparing a fetched document with a plurality of predefined cookie error patterns.

8. The method of crawling a network in claim 7, including, at each of the network crawlers, determining if the respective cookie has timed out.

9. The method of crawling a network in claim 8, including obtaining a replacement cookie using at least one of the network crawlers if the respective cookie has timed out, and updating the cookie database with the replacement cookie;

wherein the replacement cookie is obtained using the acquisition URL for the respective cookie that has timed out.

10. The method of crawling a network in claim 8, including storing in a history log at least a cookie error associated with at least a document on at least one of the hosts.

11. A computer program product for use in conjunction with a computer system, the computer program product comprising a computer readable storage medium and a computer program mechanism embedded therein, the computer program mechanism comprising a network crawler module to be executed by a plurality of computer network crawlers in parallel, the network crawler module including instructions for:

retrieving a respective cookie for a respective host from a shared cookie database that is shared by the plurality of network crawlers, so as to enable the plurality of network crawlers to have access to one or more documents on the respective host; and retrieving a document from the respective host, including sending the respective cookie to the respective host;

wherein the shared cookie database includes cookie acquisition information corresponding to each of at least a plurality of the cookies in the cookie database; the cookie acquisition information for a respective cookie including an acquisition URL;

the network crawler module further including instructions for acquiring a respective cookie from the acquisition URL specified for the cookie in the cookie database, and then accessing a respective target URL from a host on the network, the respective target URL corresponding to the acquired cookie; and instructions for detecting any of a plurality of predefined cookie errors by comparing a fetched document with a plurality of predefined cookie error patterns.

* * * * *